United States Patent
Mitra et al.

(10) Patent No.: US 12,229,604 B2
(45) Date of Patent: Feb. 18, 2025

(54) SHARED RESOURCE INTERFERENCE DETECTION INVOLVING A VIRTUAL MACHINE CONTAINER

(71) Applicant: Adobe Inc., San Jose, CA (US)

(72) Inventors: Subrata Mitra, Bangalore (IN); Pradeep Dogga, Los Angeles, CA (US)

(73) Assignee: Adobe Inc., San Jose, CA (US)

( * ) Notice: Subject to any disclaimer, the term of this patent is extended or adjusted under 35 U.S.C. 154(b) by 474 days.

(21) Appl. No.: 17/573,221

(22) Filed: Jan. 11, 2022

(65) Prior Publication Data
US 2023/0222005 A1    Jul. 13, 2023

(51) Int. Cl.
  G06F 9/50    (2006.01)
  G06N 20/00   (2019.01)

(52) U.S. Cl.
  CPC .......... *G06F 9/5077* (2013.01); *G06F 9/5016* (2013.01); *G06F 9/5022* (2013.01); *G06N 20/00* (2019.01)

(58) Field of Classification Search
  CPC .... G06F 9/5077; G06F 9/5016; G06F 9/5022; G06N 20/00; G06N 5/01; G06N 20/20
  See application file for complete search history.

(56) References Cited

U.S. PATENT DOCUMENTS

| | | | | |
|---|---|---|---|---|
| 2003/0139918 A1* | 7/2003 | Hardwick | ............... | G06F 30/33 703/22 |
| 2007/0054570 A1* | 3/2007 | Muramatsu | ........... | F02D 9/1065 440/87 |
| 2009/0213803 A1* | 8/2009 | Lee | ........................ | H04W 28/16 370/329 |
| 2010/0220536 A1* | 9/2010 | Coteus | ..................... | G11C 8/12 365/194 |
| 2011/0004885 A1* | 1/2011 | Kikuchi | .............. | H04L 41/5025 718/104 |
| 2011/0126197 A1* | 5/2011 | Larsen | ..................... | G06F 21/31 718/1 |
| 2011/0151346 A1* | 6/2011 | Kaneko | ................... | F24D 18/00 429/429 |
| 2012/0023492 A1* | 1/2012 | Govindan | ................. | G06F 9/52 718/1 |

(Continued)

OTHER PUBLICATIONS

"AppDynamics", Cisco Systems, Inc. [retrieved Nov. 12, 2021]. Retrieved from the Internet <https://www.appdynamics.com/>., Apr. 1, 2008, 7 Pages.

(Continued)

*Primary Examiner* — Tuan C Dao
(74) *Attorney, Agent, or Firm* — FIG. 1 Patents

(57) ABSTRACT

Shared resource interference detection techniques are described. In an example, a resource detection module supports techniques to quantify levels of interference through use of working set sizes. The resource detection module selects working set sizes. The resource detection module then initiates execution of code that utilizes the shared resource based on the first working set size. The resource detection module detects a resource consumption amount based on the execution of the code. The resource detection module then determines whether the detected resource consumption amount corresponds to the defined resource consumption amount for the selected working set size.

20 Claims, 11 Drawing Sheets

(56) References Cited

U.S. PATENT DOCUMENTS

| | | | |
|---|---|---|---|
| 2012/0151156 A1* | 6/2012 | Citron | G06F 12/0862 |
| | | | 711/E12.001 |
| 2014/0283077 A1* | 9/2014 | Gallella | G06F 21/53 |
| | | | 726/24 |
| 2014/0289735 A1* | 9/2014 | Togawa | G06F 9/5083 |
| | | | 718/104 |
| 2015/0185813 A1* | 7/2015 | Ping | G06F 1/3268 |
| | | | 713/323 |
| 2016/0036835 A1* | 2/2016 | Lietz | H04L 63/145 |
| | | | 726/22 |
| 2016/0037402 A1* | 2/2016 | Rosa | H04W 36/0061 |
| | | | 370/331 |
| 2016/0246652 A1* | 8/2016 | Herdrich | G06F 9/5077 |
| 2016/0378519 A1* | 12/2016 | Gaurav | G06F 9/5077 |
| | | | 718/1 |
| 2017/0060609 A1* | 3/2017 | Cropper | G06F 16/285 |
| 2017/0270449 A1* | 9/2017 | Shrimali | G06F 8/00 |
| 2018/0011736 A1* | 1/2018 | Rohleder | G06F 9/3842 |
| 2018/0285166 A1* | 10/2018 | Roy | H04L 41/0895 |
| 2019/0303211 A1* | 10/2019 | Dias | H04L 47/2425 |
| 2020/0012510 A1* | 1/2020 | Andrianov | G06F 9/45558 |
| 2020/0226305 A1* | 7/2020 | Trivelpiece | G06F 30/20 |

OTHER PUBLICATIONS

"Azure", Microsoft [retrieved Nov. 12, 2021]. Retrieved from the Internet <https://azure.microsoft.com/en-us/>., Feb. 1, 2010, 11 Pages.

"Containers on AWS", Amazon Web Services [Retrieved Nov. 12, 2021]. Retrieved from the Internet <https://aws.amazon.com/containers/services/>, 8 Pages.

"Datadog", Datadog [retrieved Nov. 12, 2021]. Retrieved from the Internet <https://www.datadoghq.com/>., 2010, 5 Pages.

"Docker", Docker, Inc. [retrieved Nov. 12, 2021]. Retrieved from the Internet <https://www.docker.com/>., 2008, 8 Pages.

"Docker Monitoring: Docker insights for business impact", AppDynamics, part of Cisco [retrieved Feb. 25, 2022]. Retrieved from the Internet <https://www.appdynamics.com/solutions/docker-monitoring>., 12 pages.

"Dynatrace", Dynatrace LLC [retrieved Nov. 12, 2021]. Retrieved from the Internet <https://www.dynatrace.com/>., Feb. 2, 2005, 7 Pages.

"Global Microservices Trends: A Survey of Development Professionals", Dimensional Research [retrieved Mar. 17, 2022]. Retrieved from the Internet <https://go.lightstep.com/rs/260-KGM-472/images/global-microservices-trends-2018.pdf>., Apr. 2018, 14 pages.

"Google Cloud Computing Services", Google [retrieved Nov. 12, 2021]. Retrieved from the Internet <https://cloud.google.com/>., Apr. 7, 2008, 10 Pages.

"IBM Cloud", IBM [retrieved Nov. 12, 2021]. Retrieved from the Internet <https://www.ibm.com/cloud>., Apr. 7, 2011, 14 Pages.

"List the available CloudWatch metrics for your instances", Amazon Web Services, Inc. User Guide for Linux Instances [retrieved Nov. 12, 2021]. Retrieved from the Internet <https://docs.aws.amazon.com/AWSEC2/latest/UserGuide/viewing_metrics_with_cloudwatch.html>., Feb. 22, 2010, 12 Pages.

"Production-Grade Container Orchestration", Kubernetes [retrieved Nov. 12, 2021]. Retrieved from the Internet <https://kubernetes.io/>., Jun. 7, 2014, 6 Pages.

Boutin, Eric , et al., "Apollo: Scalable and Coordinated Scheduling for Cloud-Scale Computing", Proceedings of the 11th USENIX Symposium on Operating Systems Design and Implementation [retrieved Nov. 12, 2021]. Retrieved from the Internet: <http://www.cs.columbia.edu/~jrzhou/pub/osdi14-paper-boutin.pdf>., Oct. 2014, 17 pages.

Chang, Michael Alan, et al., "ThrottleBot—Performance without Insight", Cornell University, arXiv Preprints, arXiv. org [retrieved Nov. 12, 2021]. Retrieved from the Internet <https://arxiv.org/pdf/1711.00618.pdf>., Nov. 2017, 7 Pages.

Cortez, Eli , et al., "Resource Central: Understanding and Predicting Workloads for Improved Resource Management in Large Cloud Platforms", SOSP '17: Proceedings of the 26th Symposium on Operating Systems Principles [retrieved Nov. 12, 2021]. Retrieved from the Internet: <https://www.microsoft.com/en-us/research/wp-content/uploads/2017/10/Resource-Central-SOSP17.pdf>., Oct. 2017, 15 pages.

Delimitrou, Christina , et al., "Bolt: I Know What You Did Last Summer . . . In The Cloud", ACM SIGARCH Computer Architecture News, vol. 45, No. 1 [retrieved Nov. 15, 2021]. Retrieved from the Internet <https://web.stanford.edu/~kozyraki/publications/2017.bolt.asplos.pdf>., Apr. 4, 2017, 15 Pages.

Delimitrou, Christina , et al., "iBench: Quantifying interference for datacenter applications", 2013 IEEE International Symposium on Workload Characterization (IISWC) [retrieved Nov. 12, 2021]. Retrieved from the Internet <https://citeseerx.ist.psu.edu/viewdoc/download?doi=10.1.1.460.460&rep=rep1&type=pdf>., 2013, 11 Pages.

Delimitrou, Christina , et al., "Paragon: QoS-Aware Scheduling for Heterogeneous Datacenters", Acm SIGPLAN Notices, vol. 48, No. 4 [retrieved Nov. 15, 2021]. Retrieved from the Internet: <https://web.stanford.edu/~kozyraki/publications/2013.paragon.asplos.pdf>., Mar. 2013, 12 pages.

Delimitrou, Christina , et al., "Quasar: Resource-Efficient and QoS-Aware Cluster Management", ACM SIGPLAN Notices vol. 49, No. 4 [retrieved Nov. 15, 2021]. Retrieved from the Internet <:https://www.csl.cornell.edu/~delimitrou/papers/2014.asplos.quasar.pdf>., Feb. 2014, 17 pages.

El-Sayed, Nosayba , et al., "KPart: A Hybrid Cache Partitioning-Sharing Technique for Commodity Multicores", 2018 IEEE International Symposium on High Performance Computer Architecture (HPCA) [retrieved Nov. 15, 2021]. Retrieved from the Internet <http://home.usto.edu.cn/~alkaid/El-Sayed%20et%20al_2018_KPart.pdf>., 2018, 14 Pages.

Ferdman, Michael , et al., "Clearing the clouds: a study of emerging scale-out workloads on modern hardware", ACM SIGPLAN Notices, vol. 47, No. 4 [retrieved Nov. 15, 2021]. Retrieved from the Internet <https://core.ac.uk/download/pdf/147978647.pdf>., Mar. 3, 2012, 11 Pages.

Gracioli, Giovani , et al., "An experimental evaluation of the cache partitioning impact on multicore real-time schedulers", 2013 IEEE 19th International Conference on Embedded and Real-Time Computing Systems and Applications [retrieved Nov. 15, 2021]. Retrieved from the Internet <https://lisha.ufsc.br/pub/Gracioli_RTCSA_2013.pdf>., Aug. 2013, 10 Pages.

Khalid, Junaid , et al., "Iron: Isolating Network-based CPU in Container Environments", NSDI'18: Proceedings of the 15th USENIX Conference on Networked Systems Design and Implementation [retrieved Nov. 12, 2021]. Retrieved from the internet <https://www.usenix.net/system/files/conference/nsdi18/nsdi18-khalid.pdf>., Apr. 9, 2018, 17 Pages.

King, Jon , "One Day Is a Lifetime in Container Years", IDG Communications, Inc. [retrieved Nov. 12, 2021]. Retrieved from the Internet <https://www.csoonline.com/article/3128860/one-day-is-a-lifetime-in-container-years.html>., Oct. 11, 2016, 2 Pages.

Mao, Hongzi , et al., "Resource Management with Deep Reinforcement Learning", HotNets '16: Proceedings of the 15th ACM Workshop on Hot Topics in Networks [retrieved Nov. 15, 2021]. Retrieved from the Internet <http://people.csail.mit.edu/alizadeh/papers/deeprm-hotnets16.pdf>., Nov. 2016, 7 pages.

Marmol, Victor , et al., "Cadvisor: Analyzes resource usage and performance characteristics of containers", GitHub, Inc., Uploaded by vmarmol [retrieved Nov. 12, 2021]. Retrieved from the Internet <https://github.com/google/cadvisor>., Jun. 9, 2014, 5 Pages.

Mars, Jason , et al., "Bubble-Up: Increasing Utilization in Modern Warehouse Scale Computers via Sensible Co-locations", Micro-44: Proceedings of the 44th Annual IEEE/ACM International Symposium on Microarchitecture [retrieved Nov. 15, 2021]. Retrieved from the Internet: <http://www.cs.virginia.edu/~skadron/Papers/mars_micro2011.pdf>., Dec. 2011, 12 pages.

McGuire, Kevin , "The Truth about Docker Container Lifecycles", New Relic. [retrieved Nov. 12, 2021]. Retrieved from the Internet <https://events.static.linuxfound.org/sites/events/files/slides/cc15_mcguire.pdf>., Aug. 17, 2015, 37 Pages.

(56) References Cited

OTHER PUBLICATIONS

Mittal, Sparsh, et al., "A Survey of Techniques for Cache Partitioning in Multicore Processors", ACM Computing Surveys, vol. 50, No. 2 [retrieved Nov. 15, 2021]. Retrieved from the Internet <https://doi.org/10.1145/3062394>., May 10, 2017, 38 Pages.

Novoseltseva, Ekaterina, "Benefits of Microservices Architecture Implementation", DZone [retrieved Nov. 12, 2021]. Retrieved from the Internet <https://dzone.com/articles/benefits-amp-examples-of-microservices-architectur>, Apr. 24, 2017, 8 Pages.

Palit, Tapti, et al., "Demystifying cloud benchmarking", 2016 IEEE International Symposium on Performance Analysis of Systems and Software (ISPASS) [retrieved Nov. 15, 2021]. Retrieved from the Internet <https://compas.cs.stonybrook.edu/~yoshen/ISPASS16_Demystifying_Cloud_Benchmarking.pdf>., Apr. 2016, 11 Pages.

Verma, Abhishek, et al., "Large-scale cluster management at Google with Borg", EuroSys '15: Proceedings of the Tenth European Conference on Computer Systems, Article No. 18 Bordeaux, France [retrieved Nov. 15, 2021]. Retrieved from the Internet: <https://storage.googleapis.com/pub-tools-public-publication-data/pdf/43438.pdf>., Apr. 2015, 18 pages.

Wang, Yuwei, et al., "I/O Congestion-Aware Computing Resource Assignment and Scheduling in Virtualized Cloud Environments", 2016 IEEE Trustcom-BigDataSE-ISPA [retrieved Mar. 17, 2022]. Retrieved from the Internet <https://doi.org/10.1109/TrustCom.2016.0205>., Aug. 2016, 8 pages.

Wright, Eric, "The Trend Towards Microservices and Containerization", Turbonomic, Inc Blog [online][retrieved Nov. 12, 2021]. Retrieved from the Internet <https://blog.turbonomic.com/blog/on-technology/trend-towards-microservices-containerization>., Jan. 7, 2015, 10 Pages.

Yunjing, Xu, "Characterizing and Mitigating Virtual Machine Interference in Public Clouds", University of MichiganProQuest Dissertations Publishing [retrieved Nov. 15, 2021]. Retrieved from the Internet <https://deepblue.lib.umich.edu/bitstream/handle/2027.42/107111/yunjing_1.pdf?sequence=1&isAllowed=y>., 2014, 137 Pages.

Zhang, Xiao, et al., "CPI2: CPU performance isolation for shared compute clusters", EuroSys '13: Proceedings of the 8th ACM European Conference on Computer Systems, Prague, Czech Republic [retrieved Nov. 12, 2020]. Retrieved from the Internet <https://static.googleusercontent.com/media/research.google.com/en//pubs/archive/40737.pdf>., Apr. 2013, 13 pages.

* cited by examiner

Algorithm 1

1: procedure SENSE
2:     $N \leftarrow$ Number of Working Set Sizes(WSS)
3:     $Distributions[N] \leftarrow$ Distribution of probe execution time per WSS
4:     $WSSBegin \leftarrow$ Initial WSS
5:     $WSSEnd \leftarrow$ Maximum WSS
6:     $Iter \leftarrow$ Number of iterations to probe
7:     while True do
8:        $i \leftarrow 0$
9:        while $(i \leq N)$ do
10:           $WSS \leftarrow WSSBegin + i * (WSSEnd - WSSBegin)/N$
11:           $block \leftarrow \textbf{malloc}(WSS)$
12:           $begintime \leftarrow \textbf{clock}()$
13:           for $Iter$ do Probe cache with WSS
14:           $endtime \leftarrow \textbf{clock}()$
15:           if $(endtime - begintime) \notin Distributions[i]$ then
16:              *Flag* "Interference present at level $i$"
17:              $i \leftarrow 0$
18:              continue
19:           $i \leftarrow i + 1$

Fig. 7

SHARED RESOURCE INTERFERENCE DETECTION INVOLVING A VIRTUAL MACHINE CONTAINER

BACKGROUND

Service provider systems have been developed to make a variety of digital services available to client devices over a network. An example of this is implementation of "the cloud" in which hardware and software resources of the service provider system are provided for access over a network to various entities to perform desired computational tasks.

To do so, a virtual machine is implemented that represents a collection of hardware and software resources of the service provider system. Virtual machines are based on computer architectures and provide functionality of a physical computer as a virtualization of the physical computer. As a result, a digital service (e.g., an application) is executed "within" the virtual machine, which isolates execution of the digital service from execution of other digital services by other virtual machines.

Containers have subsequently been developed to provide further isolation of execution of digital services within respective virtual machines. An entity, for instance, may obtain rights to implement a virtual machine and use containers to isolate execution of different digital services within the virtual machine. Containers support fine-grained scaling in the execution of digital services. Containers are considered light weight in comparison with virtual machines in that containers share operating system kernels and other resources within the virtual machine and thus are deployable within the virtual machines with less overhead.

Execution management of containers within virtual machines encounters numerous challenges. For example, perfect performance isolation in the execution of the digital services using containers it not obtainable due to use of shared resources such as memory (e.g., cache), bandwidth, operating system kernels, and so on. Consequently, execution of a digital service within a container affects other digital services executed within other containers within the same virtual machine. This may also affect execution of digital services within other virtual machines, e.g., which are implemented on a same physical computing device. This is referred to as double virtualization as involving virtual machines and containers within those virtual machines. Double virtualization, however, causes conventional techniques used to detect and mitigate performance interference to fail, especially for shared resources. This results in inefficient use of computational resources used to support execution of the virtual machines and containers as well as the digital services provided by these entities.

SUMMARY

Shared resource interference detection techniques are described. In an example, a resource detection module supports techniques to quantify levels of interference through use of working set sizes. Each working set size is associated with a defined resource consumption amount. The resource detection module begins by selecting a first working set size. The resource detection module then initiates execution of code that utilizes the shared resource based on the first working set size. The resource detection module detects a resource consumption amount based on the execution of the code.

The resource detection module then determines whether the detected resource consumption amount corresponds to the defined resource consumption amount for the selected working set size. If so, successively larger working set sizes are selected and utilized to initiate execution of code until correspondence is no longer achieved or each working set size has been processed, which indicates interference has not occurred. If not, the iterations cease. The resource detection module outputs a result indicating an amount of interference based on the working set size of a current iteration.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 7 is an illustration of an example algorithm depicting working set size selection and reporting of interference detection results based on which iteration detected interference.

DETAILED DESCRIPTION

Overview

Figure 1:
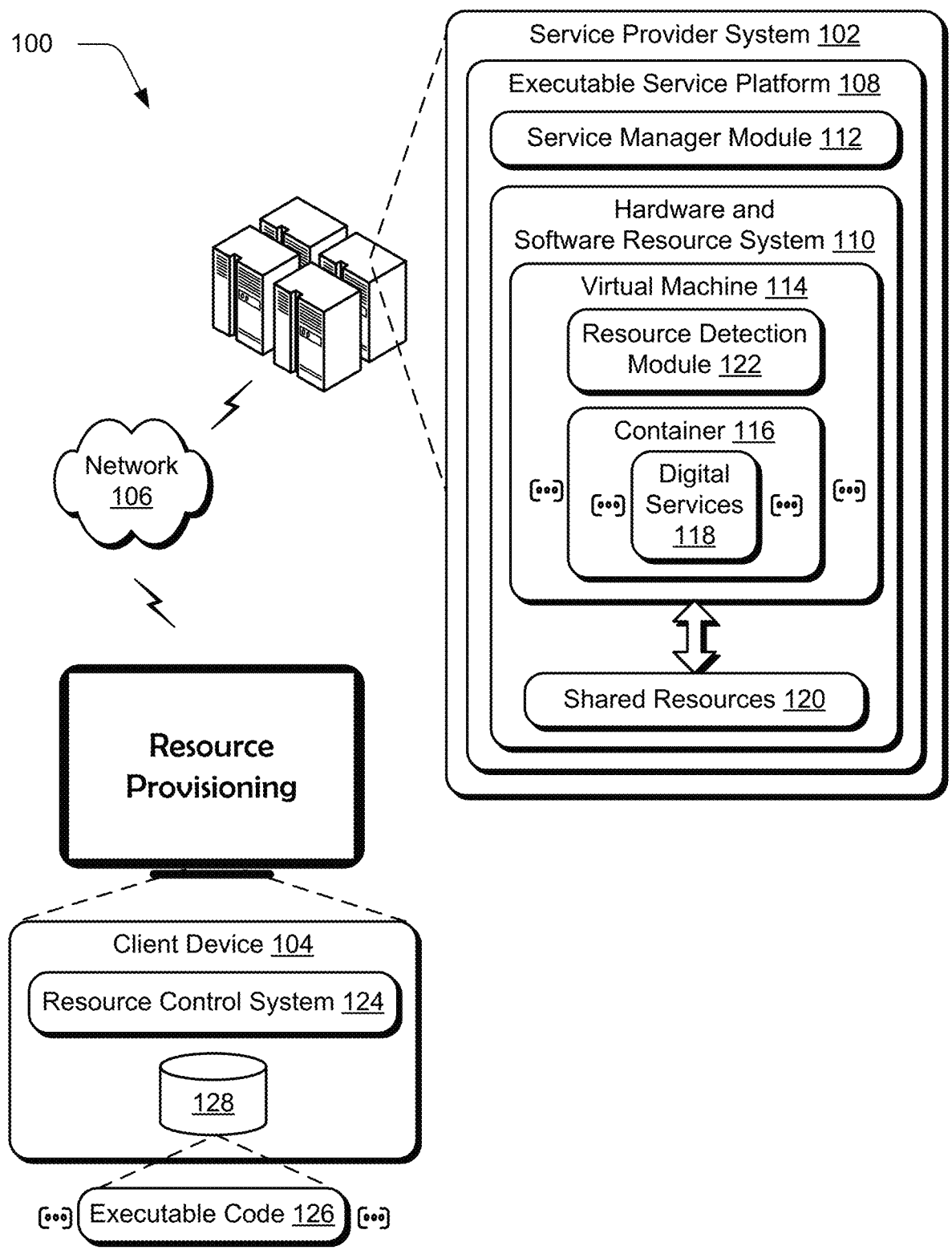
FIG. 1 is an illustration of an environment in an example implementation that is operable to employ shared resource interference detection techniques described herein.

Container use within virtual machines for execution of digital services has experienced widespread adoption by service provider systems, e.g., "cloud providers." However, perfect performance isolation is not achieved due to use of shared resources, e.g., caches, memory, and so on. Therefore, interference is experienced in some instances between execution of a digital service that accesses these shared resources even when executed in separate containers and separate virtual machines. Although conventional techniques have been developed to detect and mitigate performance interference (e.g., through use of hardware counters and application profiling), these techniques fail due to double virtualization encountered through the nested use of containers within virtual machines. A service provider system that makes the virtual machines available, for instance, may lack visibility is as to "what" is being executed within respective containers as controlled by a respective entity that accesses that virtual machine.

Accordingly, interference detection techniques are described for virtual machine containers that overcome challenges of conventional techniques to improve operation of computing devices that implement virtual machines and containers. These techniques support a service-agnostic approach to detect interference involved in accessing shared resources and is readily added into existing digital service architectures. Interference detection also supports an ability to mitigate against this interference, and thus improves computing device operation used to implement the digital services without having a negative effect on digital service execution.

In an example, digital services are executed within respective containers of a virtual machine. A resource detection module is also executed to detect interference resulting from usage of shared resources by the digital services. The resource detection module, for instance, is executable within a respective container to detect interference of digital services executed in other containers within a virtual machine in consuming shared resources. In this way, interference between containers within a virtual machine is detected. The resource detection module is also configurable to detect interference between containers executed on other virtual machines that access a shared resource, other virtual machines, and even other physical devices (e.g., accessing a shared resource such as a network connection). Thus, the resource detection module is configured to detect interference between containers within a virtual machine as well as interference caused by other virtual machines and containers within those machines. By implementing the following techniques, the resource detection module does not cause interference in the execution of digital services, is sensitive to shared resource interference, and is agnostic to digital service level details used by any entity interested in detecting interference.

To do so, the resource detection module supports techniques to quantify levels of interference through use of working set sizes. A working set size defines an amount of a resource (e.g., memory, bandwidth) utilized by a digital service during execution. In an example in which the shared resource is memory, a digital service implements an application that populates a defined portion of memory, but uses a portion of this memory at any one point in time as part of executing the digital service. The working set size, therefore, is the amount of resources (e.g., capacity) used at that point in time by the digital service.

Accordingly, the resource detection module obtains a plurality of working set sizes, e.g., which are determined during testing to quantify different levels of interference. Each working set size is associated with a defined resource consumption amount, e.g., an amount of time for execution, that is determined during testing. The resource detection module begins by selecting a first working set size, e.g., the smallest working set size that will consume the least amount of resources during execution. The resource detection module then initiates execution of code that utilizes the shared resource based on the first working set size, e.g., executes the code for a number of iterations as part of a "for" loop. The resource detection module detects a resource consumption amount based on the execution of the code. In an example in which the resource consumption amount is time, the resource consumption module records an amount of time used to execute the code, e.g., for the number of iterations based on the working set size.

The defined resource consumption amount is configurable in a variety of ways. Continuing with the above example in which the amount is time, the defined resource consumption amount is defined as an expected distribution of time learned during testing. The resource detection module then determines whether the detected resource consumption amount (e.g., recorded amount of time) corresponds to the defined resource consumption amount for the selected working set size, e.g., lies within the expected distribution. If so, successively larger working set sizes are selected and utilized to initiate execution of code (e.g., over corresponding numbers of iterations) until correspondence is no longer achieved or each working set size has been processed, which indicates interference has not occurred.

In an instance in which correspondence is not achieved (e.g., the resource consumption amount that is detected lies outside the expected distribution of the defined resource consumption amount), the iterations cease. This reduces the chances of potential interference in consumption of the shared resource by the resource detection module. The resource detection module outputs a result indicating an amount of interference based on the working set size of a current iteration, e.g., based on which working set size caused detection of potential interference. In this way, the resource detection module is configured to detect potential interference in consumption of shared resources even in double virtualization scenarios, which is not possible using conventional techniques.

The result output by the resource detection module may be utilized in a variety of ways to control operation of hardware and software resources, e.g., in order to mitigate and even avoid interference in the consumption of the shared resources. The result, for instance, is utilized by a resource control system of a client device to control execution of digital services within respective virtual machines caused by the client device. The result is also utilized by a resource control system of the service provider system itself, e.g., to provision and schedule implementation of virtual machines by different computing devices. In one example, a machine-learning model is trained using machine learning (e.g., as a neural network is a classifier model example) to process the result to identify potential interference before this interference occurs, thereby further improving operation of the computing devices that implement the virtual machines and containers. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ shared resource interference detection techniques described herein. The illustrated environment 100 includes a service provider system 102 and a client device 104 that are communicatively coupled, one to another, via a network 106. Computing devices that implement the service providers system 102 and the client device 104 are configurable in a variety of ways.

A computing device, for instance, is configurable as a desktop computer, a laptop computer, a mobile device (e.g., assuming a handheld configuration such as a tablet or mobile phone), and so forth. Thus, a computing device ranges from full resource devices with substantial memory and processor resources (e.g., personal computers, game consoles) to a low-resource device with limited memory and/or processing resources (e.g., mobile devices). Additionally, a computing device is also representative of a plurality of different devices, such as multiple servers utilized by a business to perform operations "over the cloud" as illustrated for the service provider system 102 and as described in FIG. 12.

The service provider system 102 includes an executable service platform 108 having a hardware and software resource system 110. The executable service platform 108, for instance, is configured to provide digital services "in the cloud" that are accessible by the client device 104 via the network 106 through execution by the hardware and software resource system 110. Thus, the hardware and software resource system 110 provides an underlying infrastructure to manage execution of digital services.

The executable service platform 108 supports numerous computational and technical advantages, including an ability of the service provider system 102 to readily scale resources to address wants of an entity associated with the client device 104. Thus, instead of incurring an expense of purchasing and maintaining proprietary computer equipment for performing certain computational tasks, cloud computing provides the client device 104 with access to a wide range of hardware and software resources so long as the client has access to the network 106.

To portion the hardware and software resource system 110, a service manager module 112 of the executable service platform 108 employs a virtual machine 114 having containers 116 that are used to managed execution of digital services 118. Virtual machines 114 are based on computer architectures and virtualize functionality of a physical computer. Virtual machines 114, for instance, are made available via the network 106 by the service manager module 112 to permit execution of digital services 118 specified via the client device 104. Therefore, virtual machines 114 may be associated respective clients of the client devices 104 to execute the digital services "in the cloud" and isolate execution of the digital services from the execution of digital services specified by other client devices, i.e., other entities.

The containers 116 provide further isolation of execution of digital services 118 within respective virtual machines 114. An entity, for instance, obtains rights to implement the virtual machine 114 and uses the containers 116 to isolate execution of different digital services within the virtual machine 114. The digital services 118, for instance, are configurable as applications that are executed within respective containers within respective virtual machines 114.

Container orchestration tools allow performance monitoring of the containers by reporting resource usage metrics such as CPU, memory, network, memory, etc. and provisions isolation of resource usage. However, this double virtualization (i.e., applications running within containers 116 inside virtual machines 114) makes it difficult to monitor and reason as to how the shared resources 120 such as last-level-cache, memory bandwidth, OS kernels, network bandwidth and so on are being used across different containers 116 and within different virtual machines 114. Accordingly, a resource detection module 122 is configured to detect shared resource interference that overcomes conventional challenges caused by double virtualization.

Figure 2:
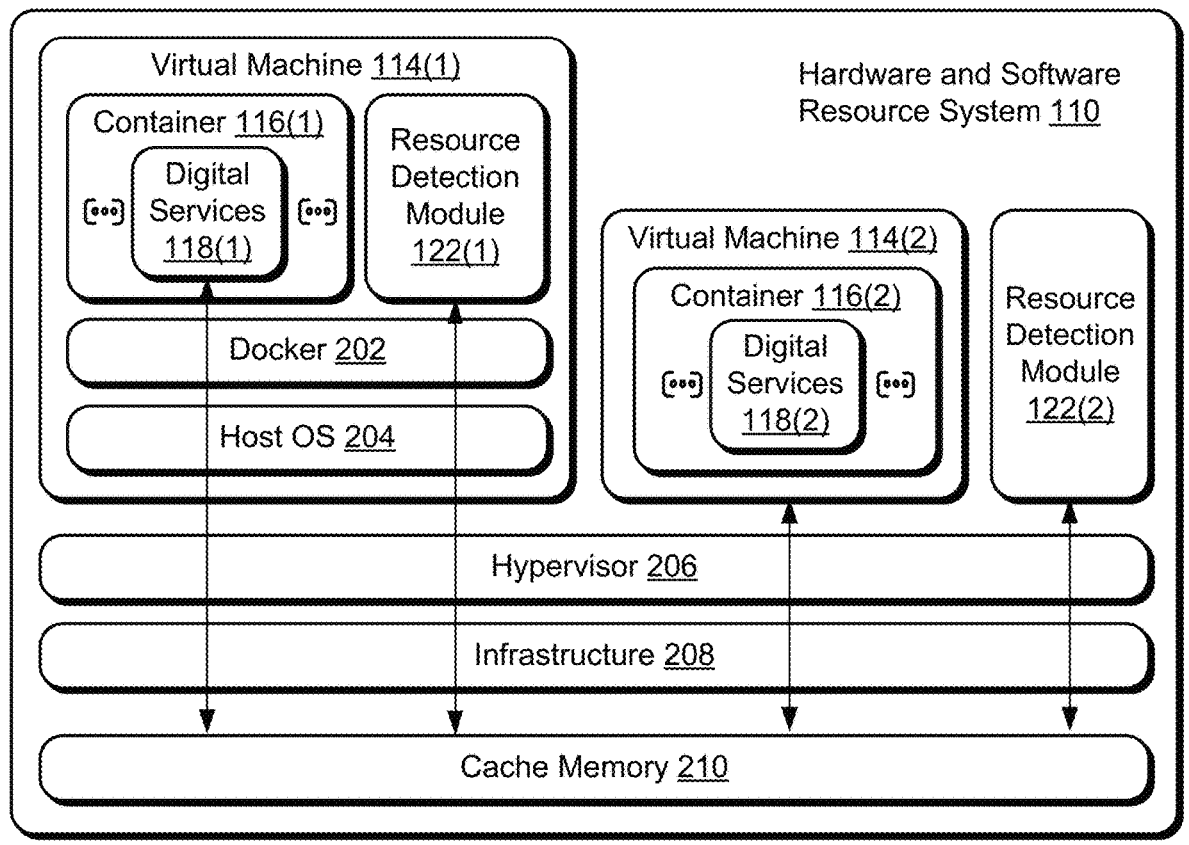
FIG. 2 depicts a system in an example implementation showing an example of shared resource consumption.

FIG. 2 depicts a system 200 in an example implementation showing operation of the resource detection module 122 in greater detail. Implementation of the resource detection module 122 is configurable in a variety of ways. In a first example, the resource detection module 122(1) is executed within its own container within a virtual machine 114(1). Therefore, the resource detection module 122(1) is configured to detect interference regarding shared resources within the virtual machine 114(1), e.g., a docker 202 and host operating system 204) with digital services 118(1) executed within another container 116(1) in the virtual machine 114(1). This also includes an ability to detect interference with shared resources "outside" of the virtual machine 114(1), examples of which include a hypervisor 206, infrastructure 208, and cache memory 210. The hypervisor 206 is a type of emulator implemented using software, firmware, and/or hardware (e.g., the infrastructure 208 and cache memory 210) that implements the virtual machines 114(1), 114(2).

In another example, the resource detection module 122(2) is implemented "outside" the virtual machine 114(1), e.g., on its own dedicated virtual machine. Execution of the resource detection module 122(2) in this instance, is therefore configured to detect interference in shared resources by digital services 118(1), 118(2), within respective containers 116(1), 116(2) of respective virtual machines 114(1), 114(2).

With the rise in use of containers 116 as part of implementation of digital services 118 as well as deployments of containers 116 by entities within their own respective virtual machines 114, an increased number of latency sensitive services such as machine-learning inferences, web-services, light-weight databases are being hosted within containers 116. These types of digital services 118 are sensitive to performance fluctuations as those fluctuations can result in bad user experiences for millions of users. In practice, it has been found that aggressive resource use by a digital service within a container can indeed create severe performance degradation for other digital services executed within another container within same physical machine. Thus, detecting and mitigating interference due to resource sharing among containers is a primary technique usable to optimize user-experience, resource allocation, utilization, and cost of deploying containers. Although conventional techniques have been developed to detect and mitigate interference between digital services in shared environment which make use of hardware-counters, detecting and mitigating interference in scenarios where access to hardware-counters is not feasible still remains unsolved.

For scenarios when containers 116 are deployed inside rented virtual machines 114 for added security, this security also introduces challenges to the service provider systems 102, e.g., cloud providers. This security realized through containers also introduce challenges to clients that initiate the digital services via respective client devices 104 and resource control systems 124, e.g., executable code 126 illustrated as stored in a storage device 128. This is due to a service provider system 102 being agnostic to service-level performance metrics. This is also due to limited insight by resource usage metrics reported by conventional orchestration tools in scenarios where the performance of the container is drastically affected due to interference with non-isolatable shared resources such as last-level-cache, OS-kernel, memory, bandwidth, and so forth.

In scenarios where clients make decisions to optimize for service-level performance of containers, the root-cause of performance drops is still unknown from conventional metrics. This can lead to inefficient use of computation resources due to provisioning decisions regarding scale-out versus scale-up decisions where the optimal solution would have been a different set of co-scheduled containers sharing these resources and spawning containers accordingly.

Shared resources 120 may take a variety of forms as described above. In the following discussion, the shared resources 120 are cache memory 210, also referred to simply as a "cache." Efficient cache partitioning is a hard problem and typically does not result in guarantees across digital services. Most commodity processors have shared last level cache (e.g., L3) which can result in significant spike in execution times of executable code.

Figure 9:
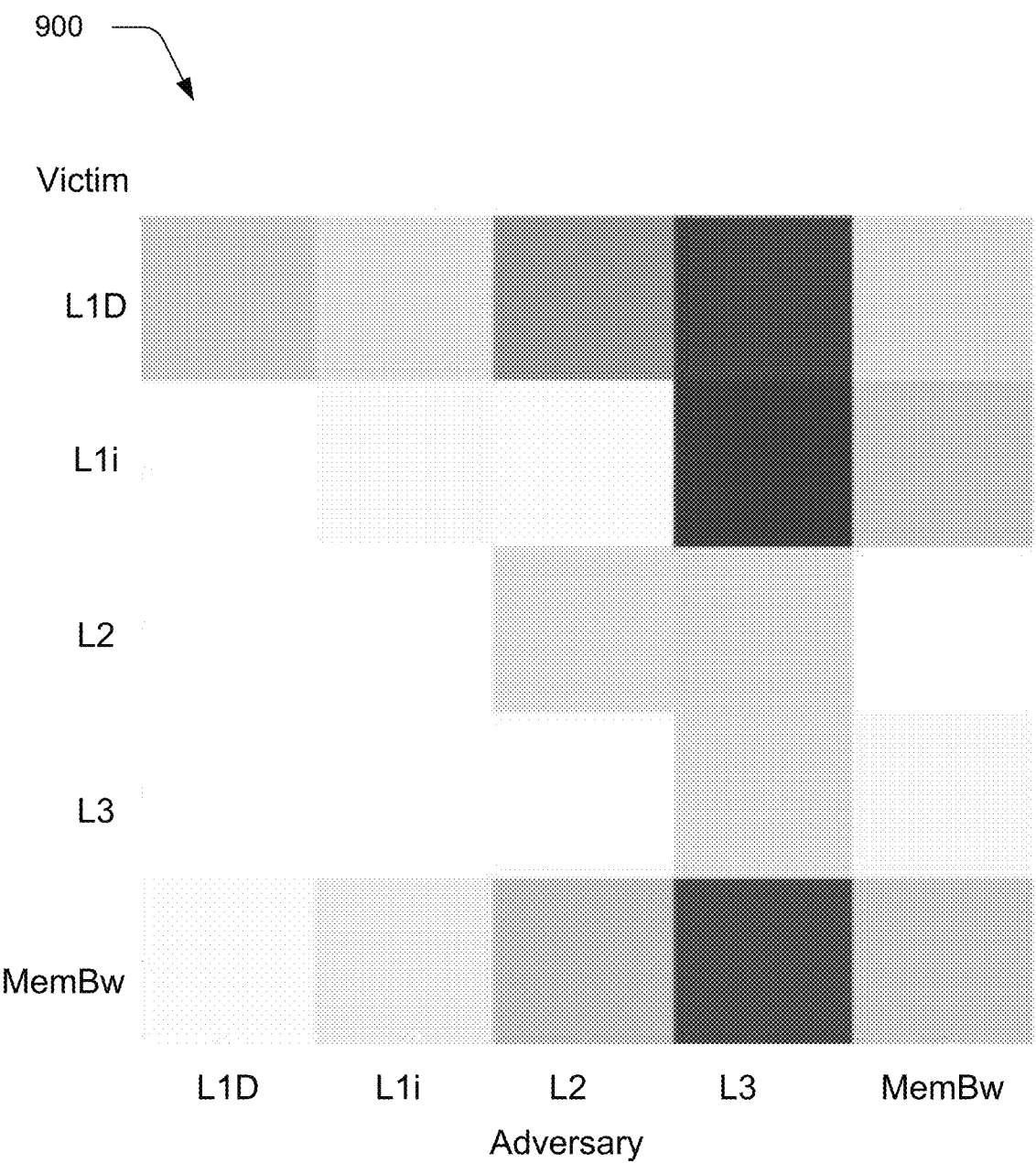
FIG. 9 depicts an example graph showing an effect on execution time of various synthetic benchmarks due to interference created by different benchmarks in a victim/adversary scenario.

FIG. 9 depicts an example graph 900 showing the effect on execution time of various synthetic benchmarks due to interference created by different benchmarks in a victim/adversary scenario. In this scenario, the victim is a container which is used to observe the effect of interference on it created by an adversarial container. Each of the benchmarks are containerized to a docker container image standard and are scheduled on processors such that the victim container and the adversary container do not share CPU hyper-threads and any resources which can be isolated using container orchestration tools. It is observed in testing that the L3 stressing container has the highest effect across each of the victim containers. Since processors typically have dedicated L1, L2 caches per physical core, a two-fold increase in execution times has been observed across benchmarks. Because L3 cache is shared and it affects L1, L2 caches, a three and a half times increase has been observed in execution times with a maximum of five times increase in some cases. Since executable code has significant usage of low-level caches, the effect of cache interference on instruction execution times is significant.

In practice, the average number of containers 116 co-scheduled on a piece of hardware is higher compared to the average number of virtual machines 114 on the same piece of hardware due to higher level of virtualization, which makes it difficult and inefficient to maintain hardware counters per container. FIG. 9 illustrates how co-location can cause interference and hence resulting in decreased performance. With the increase in the number of containers that are co-located this problem is exacerbated. The average lifetime of a container is typically less when compared to a virtual machine 114, which also makes conventional techniques involving profiling containers difficult as causing high overhead for smaller gains. This is caused by exposing the container under various execution workloads and determining an optimal distribution of resources resulting in loss of time and resources. On the other hand, conventional techniques to augment hardware to maintain counters per container is not scalable and causes performance overheads and have unavoidable deployment challenges. Accordingly, shared resource interference techniques are described in the following sections which overcome these technical challenges.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Shared Resource Interference Detection

Figure 8:
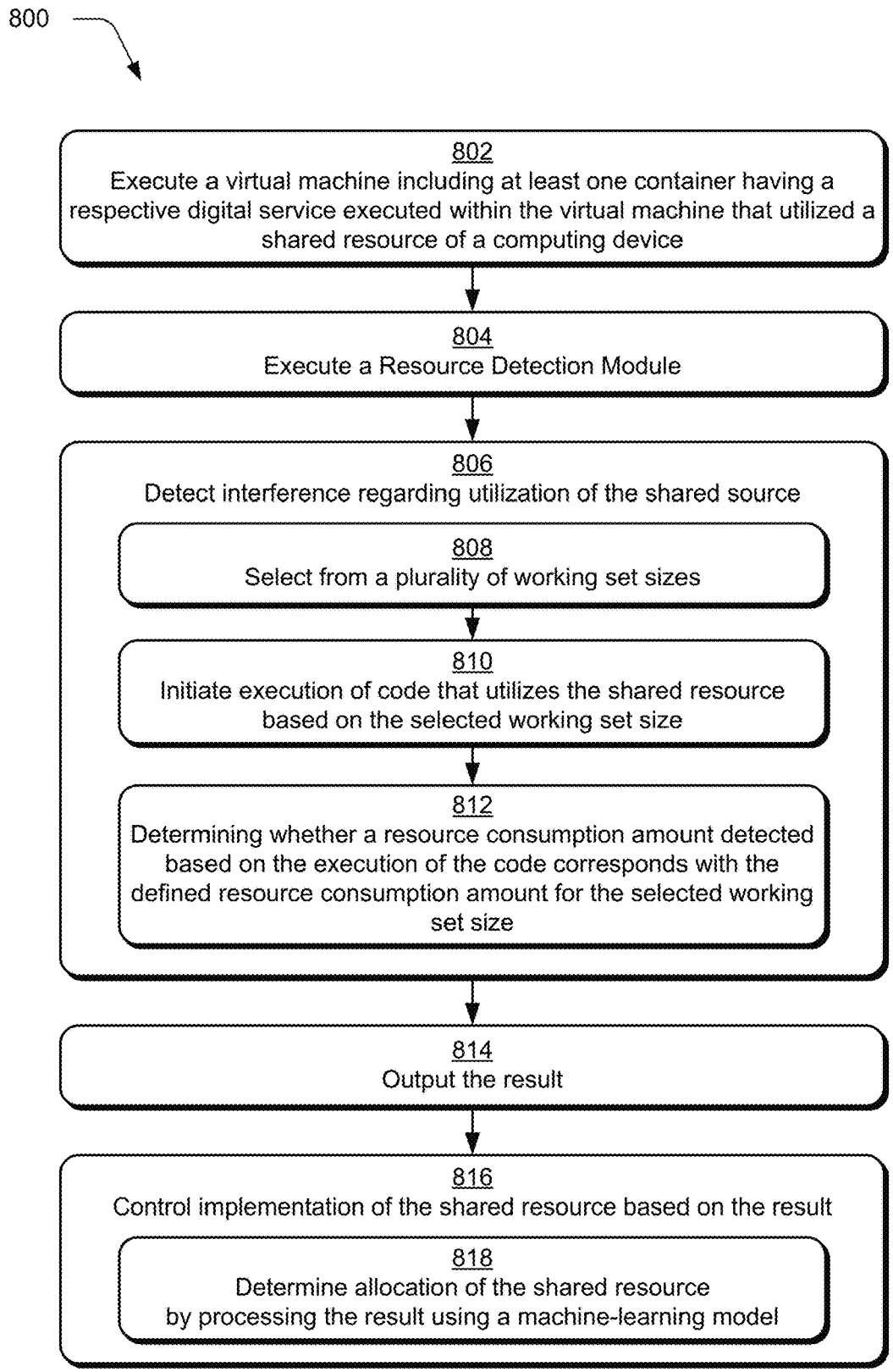
FIG. 8 is a flow diagram depicting a procedure in an example implementation of shared resource interference detection involving a virtual machine container.

The following discussion describes interference detection techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-11 in parallel with a discussion of an example procedure 800 of FIG. 8.

Figure 3:
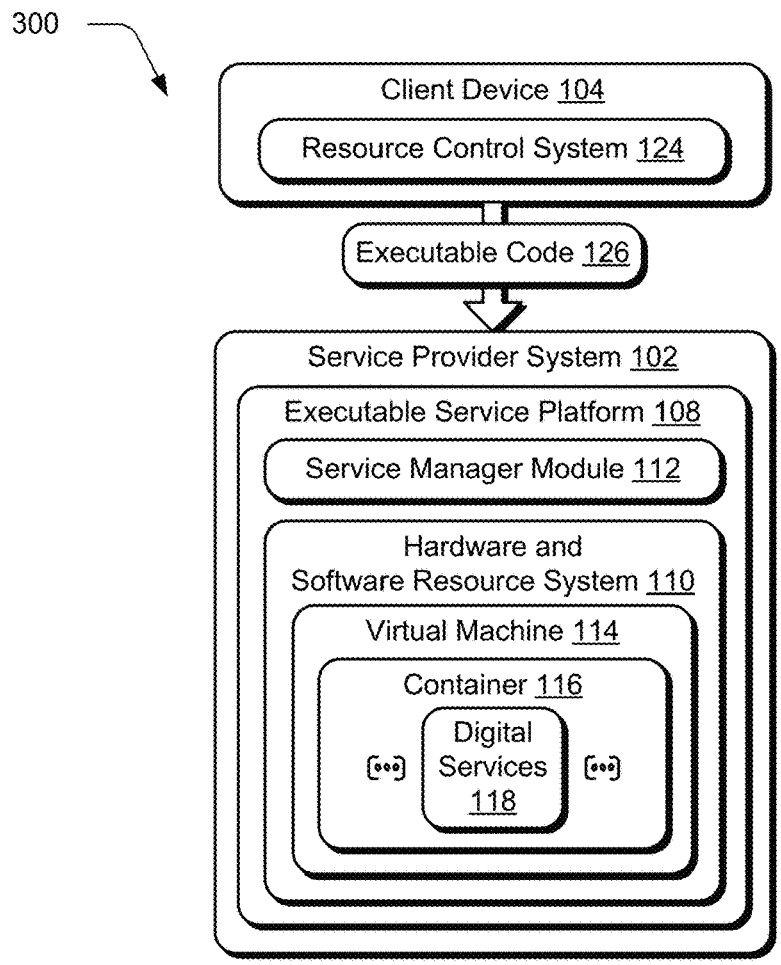
FIG. 3 is an illustration of a virtual machine including at least one container having a respective digital service executed within the virtual machine that utilizes a shared resource of a computing device.

As shown in the example 300 of FIG. 3, a virtual machine 114 including at least one container 116 having a respective digital service 118 is executed within the virtual machine 114 that utilizes a shared resource 120 of a computing device (block 802). An entity associated with a client device 104, for instance, interacts with a user interface that specifies executable code 126 (e.g., an executable job) to be implemented using the digital service 118. The respective virtual machine 114 that is tasked with executing the code is made available by the service provider system 102 to the client device 104, e.g., for a fee, subscription based, etc.

In order to isolate execution of the digital service 118, the resource control system 124 of the client device 104 initiates creation of a container 116 within the virtual machine 114. Virtual machines 114 typically include respective binaries and libraries executed as part of a host operating system to support execution of digital services 118, e.g., applications. Containers 116 are disposed "on top" of the virtual machine 114 and share the host operating system kernel and respective binaries and libraries also. Containers 116 are typically implemented to isolate execution of digital services 118 from each other on a same virtual machine 114 and reduce management overhead, e.g., by running on a single OS instance such that updates, patches, and so on are applied to a single OS for multiple containers.

Figure 4:
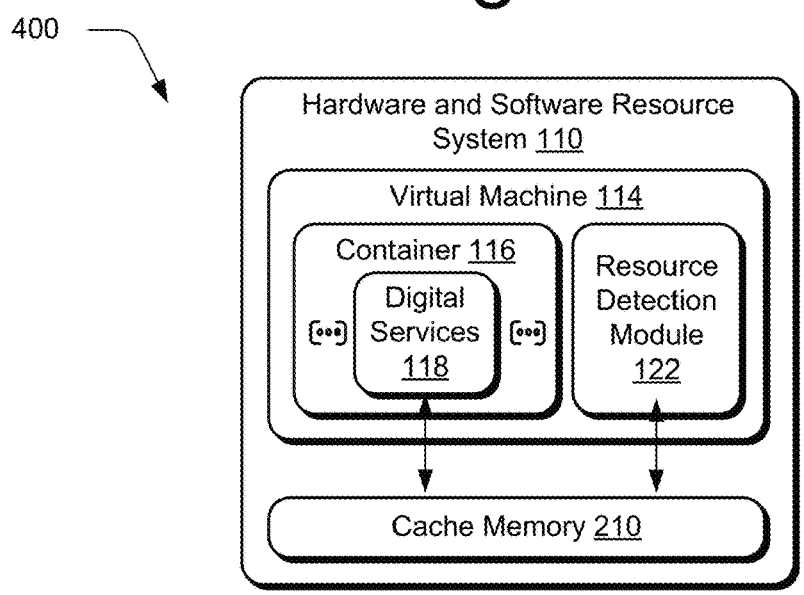
FIG. 4 depicts an example in which a resource detection module of FIG. 1 is also executed by a virtual machine.

FIG. 4 depicts an example 400 in which a resource detection module 122 is also executed (block 804) by a virtual machine. In this example, the resource detection module 122 is executed as a dedicated container within the virtual machine 114 that also includes another container 116 having the digital services 118. The shared resource 120 in this example is cache memory 210 that is accessible by both the digital services 118 within the container 116 and the resource detection module 122.

In this example, the resource detection module 122 is initiated by an entity associated with the client device 104, e.g., a subscriber to the virtual machine 114. Other instances are also contemplated, including instances in which the service provider system 102 controls execution of the resource detection module 122, e.g., within the virtual machine 114 or outside the virtual machine 114 as shown in FIG. 2. As a result, the resource detection module 122 is co-scheduled with other processes executed by the hardware and software resource system 110 to identify interference without causing harm to digital services 118 co-scheduled with it on the same hardware.

Figure 5:
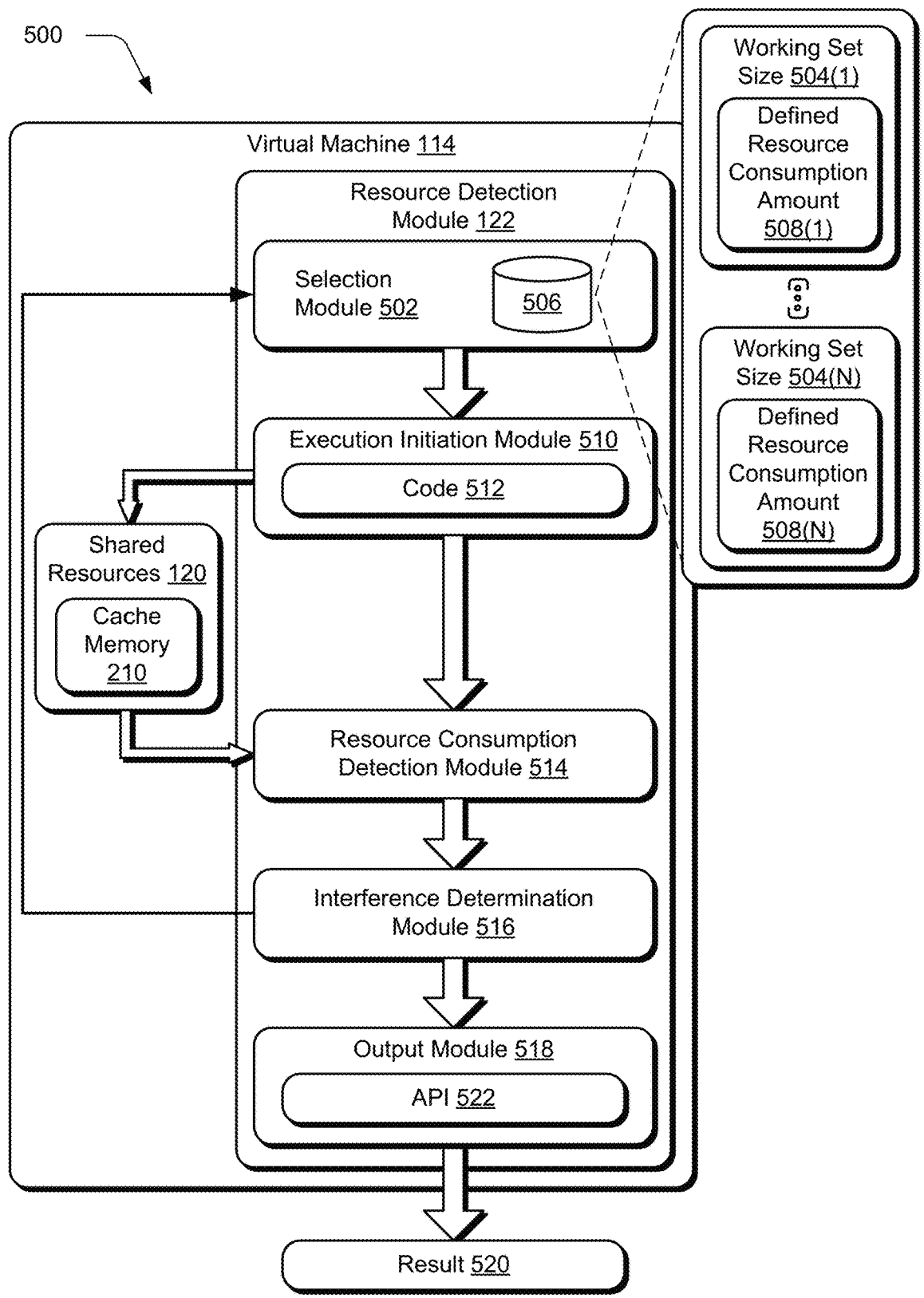
FIG. 5 depicts an example implementation showing operation of the resource detection module of FIG. 1 in greater detail as detecting interference regarding utilization of the shared resource.

FIG. 5 depicts an example implementation 500 showing operation of the resource detection module 122 in greater detail as detecting interference regarding utilization of the shared resource (block 806). The techniques used to detect interference are performable over a plurality of iterations. The resource detection module 122 acts as a proxy for a hardware counter and is configured to (1) not cause interference with execution of digital services 118, (2) sensitive to shared resource interference, and (3) agnostic to application-level details of digital services 118.

The resource detection module 122 begins through use of a selection module 502 to select a working set size from a plurality of working set sizes 504(1)-504(N) stored in a storage device 506. Each working set size 504(1)-504(N) has a defined resource consumption amount, respectively (block 808). For example, each of the plurality of working set sizes 504(1)-504(N) is defined to quantify a respective amount of interference with operation of a shared resource 120. As previously described, shared resources can vary with respect to operations supported by the resource, e.g., bandwidth, amounts of storage, processing power, power consumption, transmission or reception amounts, and so on. So to can the ways in which consumption of these resources are quantified, which is illustrated as defined resource consumption amounts 508(1)-508(N).

A working set size defines an amount of a resource (e.g., memory, bandwidth) utilized by a digital service during execution. In an example in which the shared resource is memory, a digital service implements an application that populates a defined portion of memory, but uses a portion of this memory at any one point in time as part of executing the digital service. The working set size, therefore, is the amount of resources (e.g., capacity) used at that point in time by the digital service. In this way, the resource detection module 122 is usable to quantify of level of interference by determining a working set size 504(1)-504(N), at which, interference is first detected. The working set sizes 504(1)-504 (N), for instance, are set during testing to determine effects of interference, the defined resource consumption amounts 508(1)-508(N) then describe effects of that testing, e.g., as normal distributions of values observed during testing. In an example in which resource consumption is time, the defined resource consumption amounts 508(1)-508(N) define normal distributions of times observed in testing. Therefore, the selection module 502 is configured to select successively larger working set sizes 504(1)-504(N) sequentially over success iterations.

The selected working set size 504(1) is output to an execution initiation module 510. The execution initiation module 510 is configured to initiate execution of code 512 that utilizes the shared resource (e.g., cache memory 210) based on the selected working set size (block 810). The execution initiation module 510, for instance, is configured to cause the executable code 512 to be initiated a number of times based on the selected working set size 504(1)-504(N), e.g., using a "for" loop. Thus, in this example, each of the 504(1)-504(N) has a corresponding defined number of iterations to cause the execution initiation module 510 to initiate execution of the code 512. Other examples are also contemplated, including use of respective blocks of code that are defined for respective working set sizes 504(1)-504(N), e.g., that have increasingly complex operations.

A resource consumption detection module 514 is then employed to detection a resource consumption amount based on the execution of the code 512. In an example in which the resource consumption amount is time, for instance, the resource consumption detection module 514 detects and records an amount of time taken to execute the code 512 over the defined number of iterations for the selected working set size.

The resource consumption amount detected by the resource consumption detection module 514 is passed as an input to an interference determination module 516. The interference determination module 516 is configured to determine whether the resource consumption amount detected by the resource consumption detection module 514 based on the execution of the code 512 corresponds with the defined resource consumption amount 508(1) for the selected working set size 504(1) (block 812). Continuing with the above example involving amounts of time and distributions, the interference determination module 516 determines whether the detected resource consumption amount from the resource consumption detection module 514 lies within an expected distribution of the defined resource consumption amount 508(1) for the selected working set size 504(1). If so, the process returns to the selection module 502 to select successively larger working set sizes.

If the detected resource consumption amount continues to lie within the expected distribution over successive iterations, interference is not detected, a result 520 of which is output by an output module 518 (block 814), e.g., via a respective application programming interface (API) 522. If, for a respective iteration, the detected resource consumption amount does not correspond to the defined resource consumption amount (e.g., is "outside" the distribution), execution of the code 512 ceases, thereby reducing and even preventing a possibility of interference caused by the execution of the code 512 with execution of digital services 118. The result 520 in this scenario indicates the presence of interference and may also indicate an amount of this interference, e.g., based on a respective working set size that caused the interference. FIG. 7 is an illustration of an example 700 algorithm depicting working set size selection and reporting of detection results based on which iteration detected interference.

Figure 6:
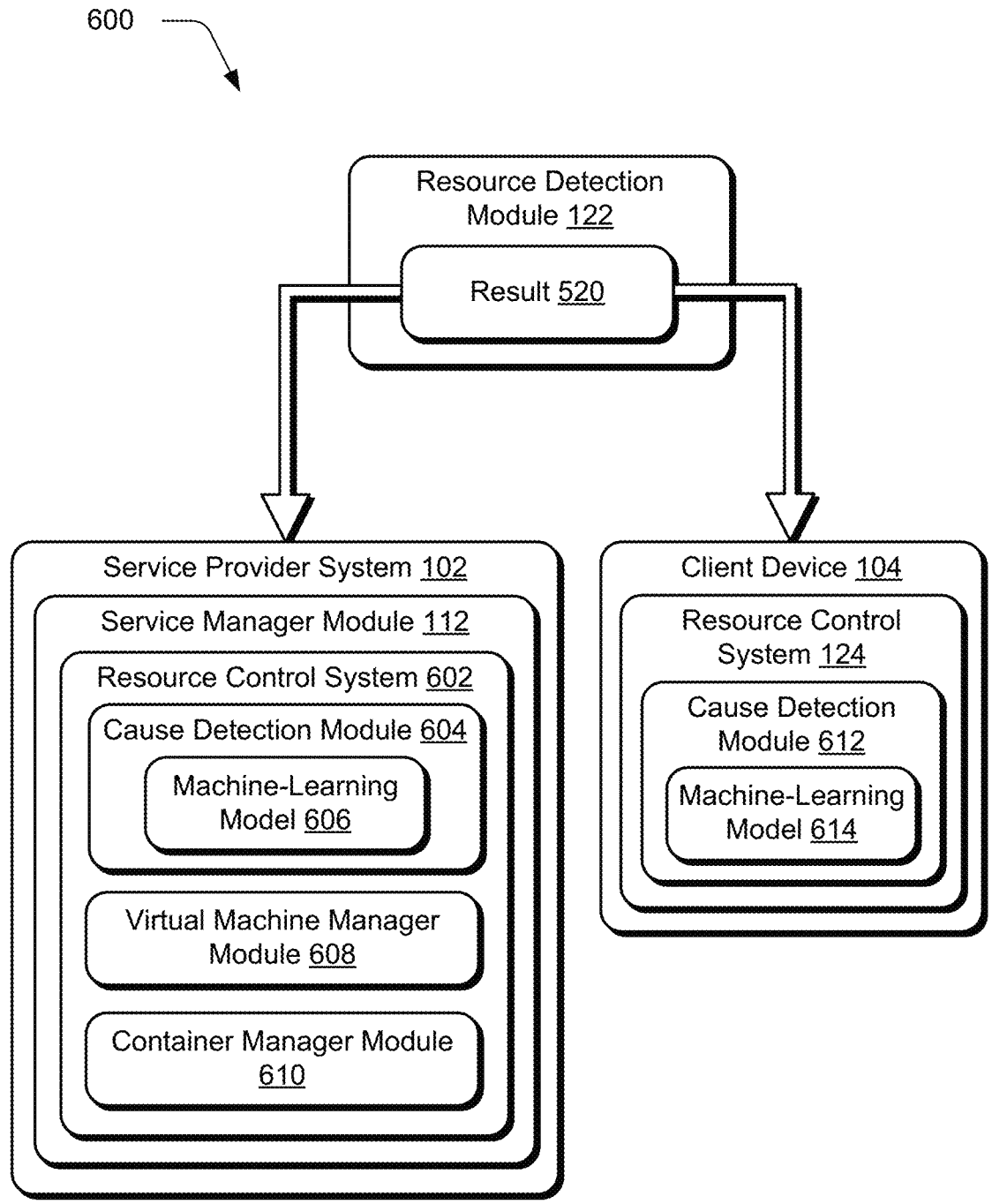
FIG. 6 depicts an example implementation of output of a result of interference detection by the resource detection module.

FIG. 6 depicts an example implementation 600 of output of the result 520 by the resource detection module 122. The result 520 is usable by both the service provider system 102 and the client device 104 to address and mitigate against potential interference as part of controlling implementation of the shared resource 120 based on the result 520 (block 816). In a service provider system 102 example, the service manager module 112 includes a resource control system 602. The resource control system 602 includes a cause detection module 604 that is configured to detect a potential cause of the interference indicated by the result 520.

To do so, a machine-learning model 606 is trained using previous results and operational metrics of the hardware and software resource system 110 that identify scenarios that involve and do not involve interference caused by respective functionality of the system. The machine-learning model 606, once trained, is then usable to process the result 520 to identify a likely cause, and based on this, take remedial actions by a virtual machine manager module 608 and/or a contained manager module 610. Examples of these actions include reallocating resources across respective containers, virtual machines, and physical machines to counter potential interference.

In this example, the processing of the result 520 by the machine-learning model 606 is usable to identify a cause of the interference. In another example, the machine-learning model 606 is trained to identify the actions, themselves, to be used to correct detected interference and/or protect against possibilities of future interference in accessing of shared resources. The machine-learning model 606, for instance, is usable to determine allocation of access to the shared resource 120 by processing the result 520 (block 818).

Similar functionality may also be incorporated by the resource control system 124 using a cause detection module 612 and machine-learning model 614 of the client device 104. The machine-learning model 614, for instance, is usable to detect a likely cause of interference when trained using training data that describes executable code 126 processed by the hardware and software resource system 110 and metrics exposed by this system. The machine-learning model 614 is also configurable to generate recommendations of actions to be taken to mitigate and/or prevent interference involving the shared resource, such as to allocate the executable code 126 for execution by a different container 116, virtual machine 114, physical machine, schedule for a different time, and so on. In this way, the techniques described herein overcome conventional challenges caused by double virtualization involving containers 116 and virtual machines 114 to improve operation of underlying hardware and software resources systems 110 of computing devices.

Figure 10:
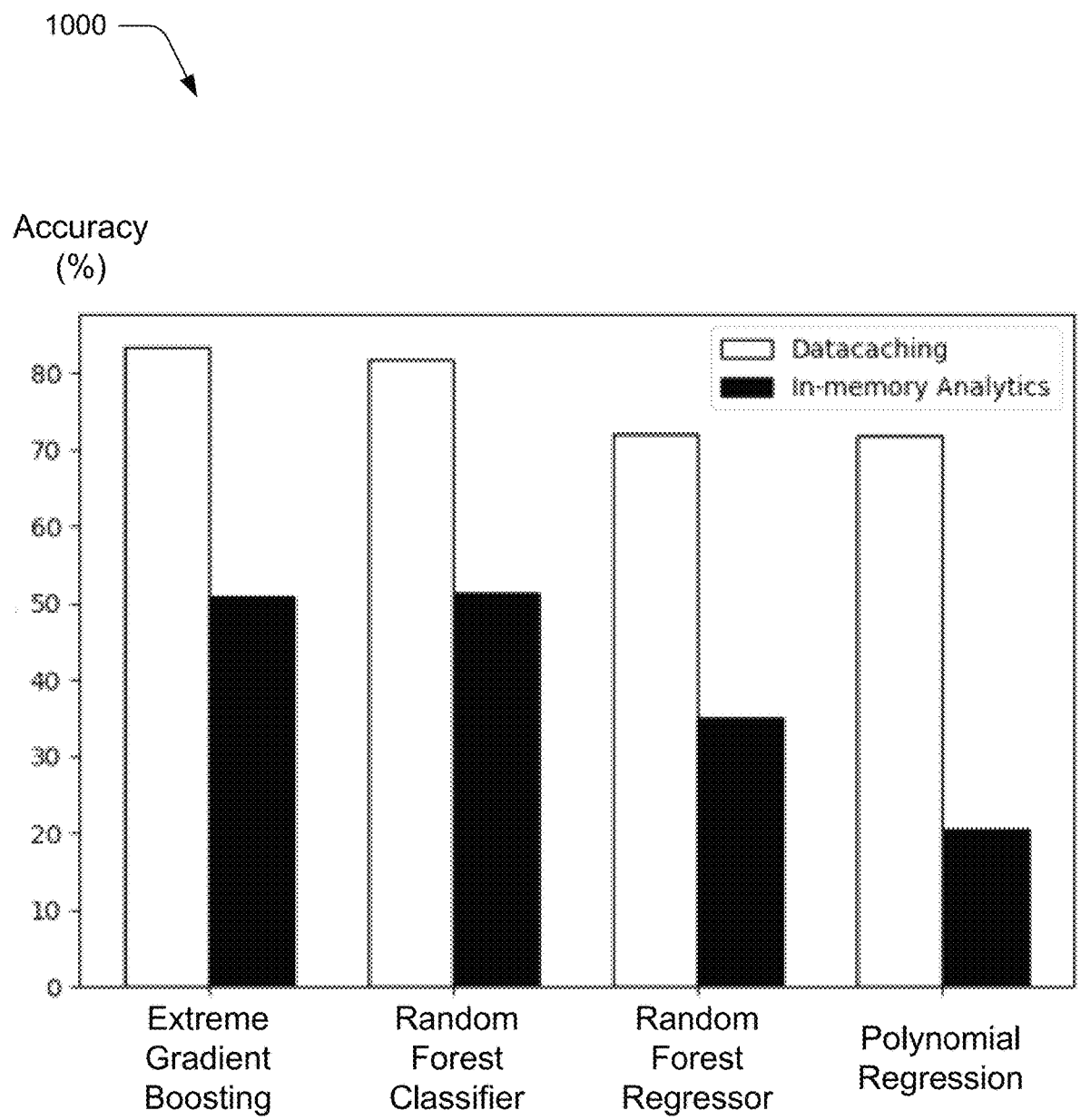
FIG. 10 is an example graph showing accuracy of machine-learning models in predicting a level of interference from metrics collected from the hardware and software resource system.

The resource control systems 124, 602, therefore, support an approach to identifying the level of interference from the available metrics per container learned from metrics exposed by the hardware and software resource system 110 and the result 520. This supports a learning-based approach to identify interference level in the system. FIG. 10 is an example graph 1000 showing accuracy of machine-learning models in predicting a level of interference from metrics collected from the hardware and software resource system 110. From the graph 1000, the models accurately predict using a caching benchmark but do not accurately predict using an in-memory analytics benchmark.

Figure 11:
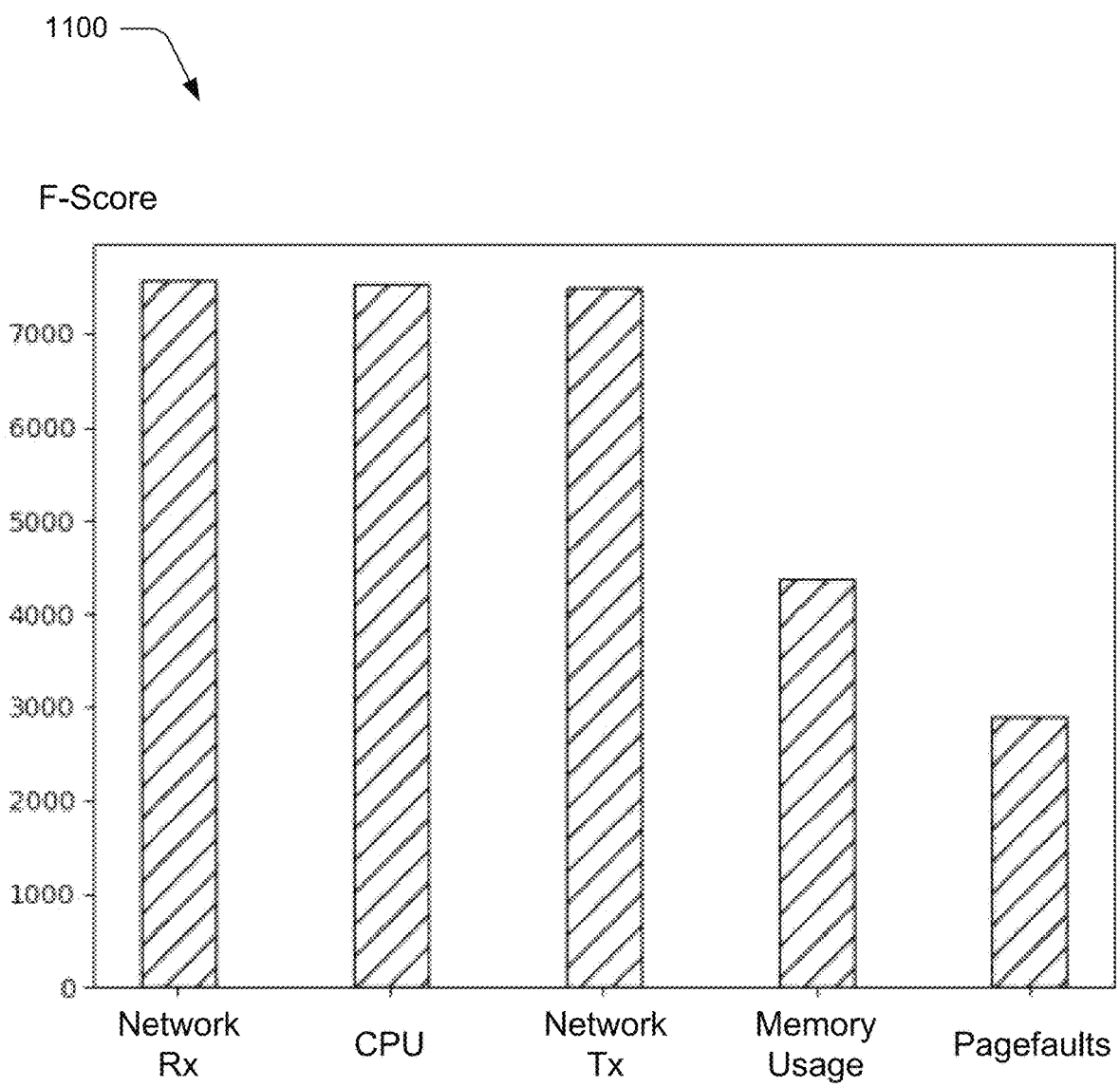
FIG. 11 is an example graph showing a relative importance of collected metrics in predicting a level of interference by F-scores from extreme gradient boosted decision trees.

FIG. 11 is an example graph 1100 showing a relative importance of collected metrics in predicting a level of interference by F-scores from extreme gradient boosted decision trees. As illustrated, the network receive and transmit throughputs and CPU have large F-scores compared to the other available metrics in predicting the value of interference in the system. This kind of an approach is useful to developers that can model the assumptions of working points and can train models to detect interference in the system without relying on the cloud provider.

Example System and Device

Figure 12:
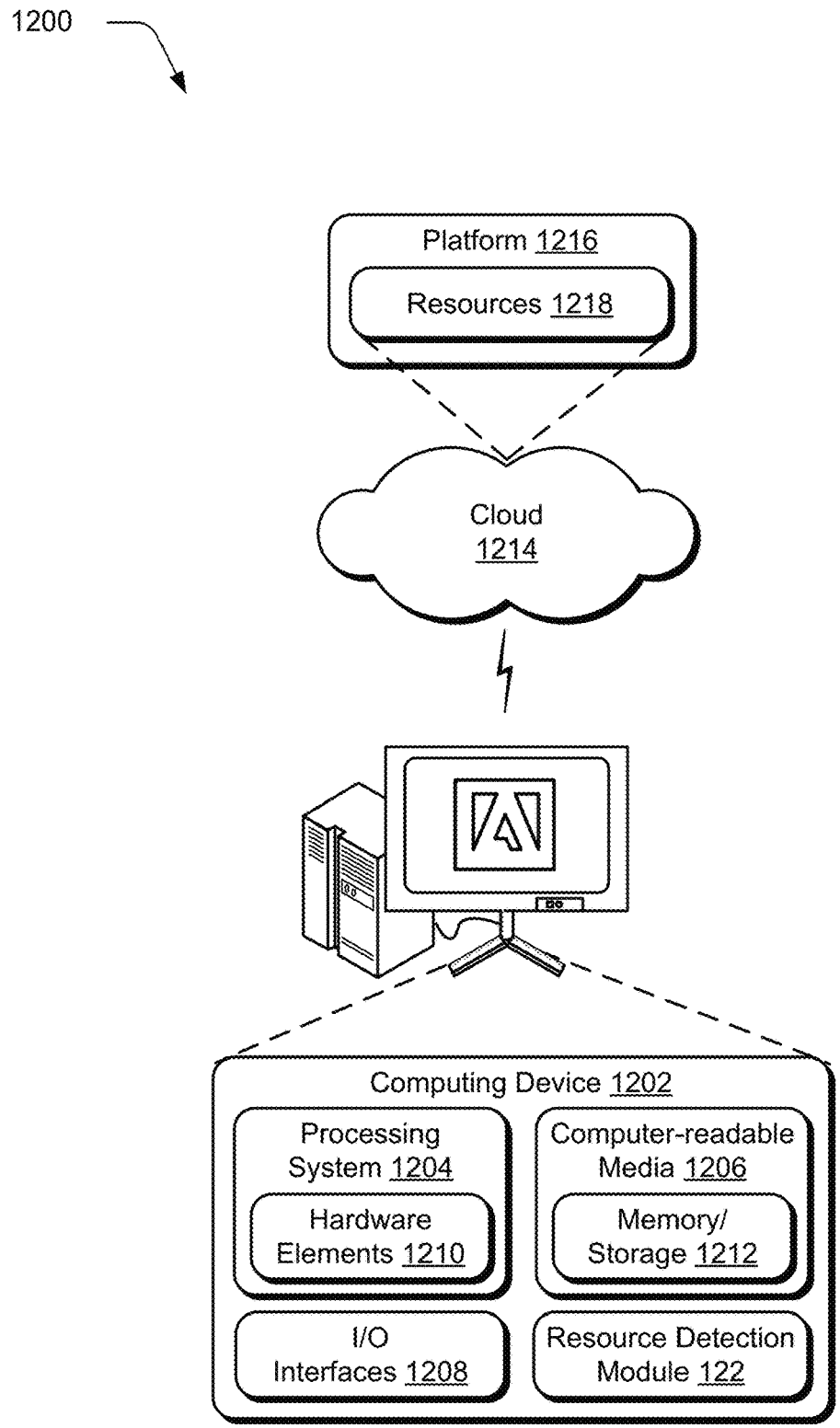
FIG. 12 illustrates an example system including various components of an example device that can be implemented as any type of computing device as described and/or utilize

FIG. 12 illustrates an example system generally at 1200 that includes an example computing device 1202 that is representative of one or more computing systems and/or devices that implement the various techniques described herein. This is illustrated through inclusion of the resource detection module 122. The computing device 1202 is configurable, for example, as a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that is configurable as processors, functional blocks, and so forth. This includes implementation in hardware as an application specific integrated circuit or other logic device formed using one or more semiconductors. The hardware elements 1210 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1206 is illustrated as including memory/storage 1212. The memory/storage 1212 represents memory/storage capacity associated with one or more computer-readable media. The memory/storage 1212 includes volatile media (such as random access memory (RAM)) and/or nonvolatile media (such as read only memory (ROM), Flash memory, optical disks, magnetic disks, and so forth). The memory/storage 1212 includes fixed media (e.g., RAM, ROM, a fixed hard drive, and so on) as well as removable media (e.g., Flash memory, a removable hard drive, an optical disc, and so forth). The computer-readable media 1206 is configurable in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1202. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1202, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1210. The computing device 1202 is configured to implement particular instructions and/or functions corresponding to the software and/or hardware modules. Accordingly, implementation of a module that is executable by the computing device 1202 as software is achieved at least partially in hardware, e.g., through use of computer-readable storage media and/or hardware elements 1210 of the processing system 1204. The instructions and/or functions are executable/operable by one or more articles of manufacture (for example, one or more computing devices 1202 and/or processing systems 1204) to implement techniques, modules, and examples described herein.

The techniques described herein are supported by various configurations of the computing device 1202 and are not limited to the specific examples of the techniques described herein. This functionality is also implementable all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 abstracts resources and functions to connect the computing device 1202 with other computing devices. The platform 1216 also serves to abstract scaling of resources to provide a corresponding level of scale to encountered demand for the resources 1218 that are implemented via the platform 1216. Accordingly, in an interconnected device embodiment, implementation of functionality described herein is distributable throughout the system 1200. For example, the functionality is implementable in part on the computing device 1202 as well as via the platform 1216 that abstracts the functionality of the cloud 1214.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
   executing, by the computing device, a virtual machine and a resource detection module, the virtual machine including at least one container having a respective digital service executed within the virtual machine that utilizes a shared resource of the computing device;
   detecting, by the resource detection module of the computing device, interference regarding utilization of the shared resource, the detecting performed over a plurality of iterations including:
      selecting from a plurality of working set sizes, each said working set size having a defined resource consumption amount, respectively, that differs, one from another;
      initiating execution of code that utilizes the shared resource based on the selected working set size; and determining whether a resource consumption amount detected based on the execution of the code corresponds with the defined resource consumption amount for the selected working set size, in which the selecting, the initiating, and the determining are performed until the resource consumption amount detected based on the execution of the code is detected as not corresponding with the defined resource consumption amount for the selected working set size; and outputting, by the resource detection module of the computing device, a result of the detecting.

2. The method as described in claim 1, wherein the resource detection module is executed within the virtual machine.

3. The method as described in claim 2, wherein the resource detection module is executed within another container within the virtual machine.

4. The method as described in claim 1, wherein the resource consumption amount is defined using a respective distribution.

5. The method as described in claim 4, wherein the respective distribution is time.

6. The method as described in claim 1, wherein the plurality of working set sizes define a respective number of times the execution of the code is initiated.

7. The method as described in claim 1, wherein the selecting is performed over the plurality of iterations as increasing the working set sizes over successive said iterations.

8. The method as described in claim 1, wherein the result indicates which of the plurality of working set sizes caused the detected resource consumption amount to not correspond with the defined resource consumption amount.

9. The method as described in claim 1, further comprising controlling implementation of the shared resource based on the result.

10. The method as described in claim 9, wherein the controlling is performed by determining an allocation of the shared resource by processing the result using a machine-learning model.

11. The method as described in claim 1, wherein the shared resource includes cache memory.

12. A system comprising:
a hardware and software system configured to execute a virtual machine including at least one container having a respective digital service executed within the virtual machine that utilizes a shared resource;
a resource detection module implemented by a computing device to detect interference regarding utilization of the shared resource, the resource detection module including:
a selection module to select a working set size from a plurality of working set sizes over a plurality of iterations as increasing the working set sizes over successive said iterations, each said working set size having a defined resource consumption amount, respectively;
an execution initiation module to initiate execution of code that utilizes the shared resource based on the selected working set size; and
an interference determination module to determine whether a resource consumption amount detected based on the execution of the code corresponds with the defined resource consumption amount for the selected working set size.

13. The system as described in claim 12, wherein the resource detection module is executed within the virtual machine.

14. The system as described in claim 13, wherein the resource detection module is executed within another container within the virtual machine.

15. The system as described in claim 12, wherein the resource consumption amount is defined using a respective time distribution.

16. The system as described in claim 12, wherein a result from the resource detection module indicates which of the plurality of working set sizes caused the detected resource consumption amount to not correspond with the defined resource consumption amount.

17. A method comprising:
executing, by a processing device, a virtual machine including at least one container having a respective digital service executed within the virtual machine that utilizes a shared resource; and
detecting, by the processing device, interference regarding utilization of the shared resource, the detecting including:
selecting a working set size from a plurality of working set sizes over a plurality of iterations as increasing the working set sizes over successive said iterations, each said working set size having a defined resource consumption amount, respectively;
initiating execution of code that utilizes the shared resource based on the selected working set size; and
determining whether a resource consumption amount detected based on the execution of the code corresponds with the defined resource consumption amount for the selected working set size.

18. The method as described in claim 17, wherein the detecting is executed within the virtual machine.

19. The method as described in claim 18, wherein the detecting is executed within another container within the virtual machine.

20. The method as described in claim 17, wherein the resource consumption amount is defined using a respective time distribution.

* * * * *